(12) United States Patent
Sugita

(10) Patent No.: US 10,009,497 B2
(45) Date of Patent: Jun. 26, 2018

(54) NETWORK COMMUNICATION APPARATUS PROVIDED WITH AUTO-SHUTDOWN FUNCTION, METHOD OF CONTROLLING THE SAME, AND STORAGE MEDIUM

(71) Applicant: CANON KABUSHIKI KAISHA, Tokyo (JP)

(72) Inventor: Hikaru Sugita, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/196,566

(22) Filed: Jun. 29, 2016

(65) Prior Publication Data
US 2017/0013154 A1    Jan. 12, 2017

(30) Foreign Application Priority Data
Jul. 8, 2015 (JP) .................................. 2015-136874

(51) Int. Cl.
*H04N 1/00* (2006.01)

(52) U.S. Cl.
CPC ..... *H04N 1/00891* (2013.01); *H04N 1/00037* (2013.01); *H04N 1/00076* (2013.01); *H04N 1/00411* (2013.01); *H04N 1/00477* (2013.01); *H04N 1/00888* (2013.01); *H04N 2201/0094* (2013.01)

(58) Field of Classification Search
CPC .................................................. H04N 1/00891
See application file for complete search history.

(56) References Cited

U.S. PATENT DOCUMENTS

| 4,631,364 A | * | 12/1986 | Coyne | ................... | H04M 9/003 |
| | | | | | 379/164 |
| 5,231,355 A | * | 7/1993 | Rider | ...................... | G01V 3/08 |
| | | | | | 324/326 |
| 6,687,344 B1 | * | 2/2004 | Tung | ....................... | H04M 1/82 |
| | | | | | 379/377 |

(Continued)

FOREIGN PATENT DOCUMENTS

| EP | 2615814 A2 | 7/2013 |
| JP | 2004056258 A | 2/2004 |

OTHER PUBLICATIONS

Extended European Search Report issued in European Patent Application No. 16177453.4, dated Nov. 30, 2016.

*Primary Examiner* — Ibrahim Siddo
(74) *Attorney, Agent, or Firm* — Rossi, Kimms & McDowell LLP

(57) ABSTRACT

A network communication apparatus equipped with an auto-shutdown function, which is improved in the convenience of a user concerning auto-shutdown control performed in a case where the apparatus is connected to a telephone line. The network communication apparatus includes a network port for connecting to the telephone line, and communicates with an external apparatus via the telephone line. Shutdown processing for stopping power supply to the apparatus is executed when a time period set by a user elapses without receiving a user's operation. If to cause the shutdown processing to be executed is selected by the user, and also connection of the network port to the telephone line is detected, the user is notified that the auto-shutdown cannot be executed.

10 Claims, 11 Drawing Sheets

(56) References Cited

U.S. PATENT DOCUMENTS

| | | | |
|---|---|---|---|
| 2006/0007469 A1* | 1/2006 | Uruma | H04N 1/0035 358/1.14 |
| 2009/0235103 A1* | 9/2009 | Yamashiro | G06F 1/3209 713/324 |
| 2010/0033751 A1* | 2/2010 | Kitamura | H04N 1/0049 358/1.14 |
| 2013/0182272 A1 | 7/2013 | Lim | |
| 2013/0223603 A1* | 8/2013 | Nakazawa | H04N 1/0001 379/100.01 |
| 2015/0276705 A1* | 10/2015 | Maeda | G01N 33/48 702/19 |

* cited by examiner

NETWORK COMMUNICATION APPARATUS PROVIDED WITH AUTO-SHUTDOWN FUNCTION, METHOD OF CONTROLLING THE SAME, AND STORAGE MEDIUM

BACKGROUND OF THE INVENTION

Field of the Invention

The present invention relates to a network communication apparatus equipped with an auto-shutdown function, a method of controlling the same, and a storage medium.

Description of the Related Art

Conventionally, image pickup apparatuses include one in which on/off control of the power supply is performed using an auto-shutdown function for automatically turning off the power supply (executing auto-shutdown) when an auto-shutdown shifting time period elapses (see Japanese Patent Laid-Open Publication No. 2004-056258).

Further, there is a globally increasing concern on energy saving. There are a lot of laws and regulations related to energy saving, and recently, for example, ErP directive Lot 26 was established. One of requirements of the Lot 26 directive limits power consumption of a device such that in a case where the operations of all network ports are stopped, power consumption is automatically reduced to 0.5 W or lower after the lapse of a time period which is appropriate for the intended use of the device and is short as much as possible, except cases inappropriate for the intended use.

This condition can be satisfied by sequentially performing the following two processes: First, a process is performed for determining whether or not all of ports included in the device, which are connected to a wireless network, a wired network, a telephone line, and so forth, are disabled. As a result of this process, if all of the ports are disabled, when the auto-shutdown shifting time period elapses without receiving a user's operation, a process is performed for executing auto-shutdown using the above-mentioned auto-shutdown function.

On the other hand, in an apparatus equipped with a facsimile function, if a port connected to the telephone line is enabled, reception timing of a facsimile is not predetermined. Therefore, in the case where the apparatus is connected to the telephone line, it is impossible to execute auto-shutdown to satisfy the condition of the Lot 26 that reduction of power consumption is started after a time period which is appropriate for the intended use of the device and is short as much as possible.

However, the situation where even though the auto-shutdown shifting time period can be set, if the apparatus is connected to the telephone line, auto-shutdown is not executed even after the auto-shutdown shifting time period elapses without receiving any user's operation is inconvenient to a user.

SUMMARY OF THE INVENTION

The present invention provides a network communication apparatus equipped with an auto-shutdown function that makes it possible to improve the convenience of a user concerning auto-shutdown control performed in a case where the apparatus is connected to a telephone line, a method of controlling the same, and a storage medium.

In a first aspect of the present invention, there is provided a network communication apparatus that includes a network port for connecting to a telephone line and a communication unit that communicates with an external apparatus via the telephone line, comprising an auto-shutdown unit configured to execute shutdown processing for stopping supply of electric power to the network communication apparatus when an auto-shutdown shifting time period elapses without receiving a user's operation, a line detection unit configured to detect whether or not the network port is connected to the telephone line, a selection unit configured to select, based on a user's operation, whether or not to cause the auto-shutdown unit to execute the shutdown processing, and a notification unit configured to notify a user that the shutdown processing cannot be executed, in a case where to cause the auto-shutdown unit to execute the shutdown processing is selected by the selection unit, and also it is detected by the line detection unit that the network port is connected to the telephone line.

In a second aspect of the present invention, there is provided a network communication apparatus that includes a network port for connecting to a telephone line and a communication unit that communicates with an external apparatus via the telephone line, comprising an auto-shutdown unit configured to execute shutdown processing for stopping supply of electric power to the network communication apparatus when an auto-shutdown shifting time period elapses without receiving a user's operation, a line detection unit configured to detect whether or not the network port is connected to the telephone line, a selection unit configured to select, based on a user's operation, whether or not to cause the auto-shutdown unit to execute the shutdown processing, and a notification unit configured to notify a user that the shutdown processing cannot be executed, when it is detected by the line detection unit that the network port is changed from a state not connected to the telephone line to a state connected to the telephone line, in a case where to cause the auto-shutdown unit to execute the shutdown processing has been selected by the selection unit.

In a third aspect of the present invention, there is provided a network communication apparatus that includes a network port for connecting to a telephone line and a communication unit that communicates with an external apparatus via the telephone line, comprising an auto-shutdown unit configured to execute shutdown processing for stopping supply of electric power to the network communication apparatus when an auto-shutdown shifting time period elapses without receiving a user's operation, a line detection unit configured to detect whether or not the network port is connected to the telephone line, and a selection unit configured to select, based on a user's operation, whether or not to cause the auto-shutdown unit to execute the shutdown processing, wherein when it is detected by the line detection unit that the network port is changed from a state not connected to the telephone line to a state connected to the telephone line, in a case where to cause the auto-shutdown unit to execute the shutdown processing has been selected by the selection unit, the auto-shutdown unit is disabled, and also a user's operation for selection by the selection unit is made impossible.

In a fourth aspect of the present invention, there is provided a network communication apparatus that includes a network port for connecting to a telephone line and a communication unit that communicates with an external apparatus via the telephone line, comprising an auto-shutdown unit configured to execute shutdown processing for stopping supply of electric power to the network communication apparatus when an auto-shutdown shifting time period elapses without receiving a user's operation, a line detection unit configured to detect whether or not the network port is connected to the telephone line, a selection unit configured to select, based on a user's operation, whether or not to cause the auto-shutdown unit to execute the shutdown processing, and a display unit configured to display, when it is detected by the line detection unit that the network port is changed from a state not connected to the telephone line to a state connected to the telephone line, a selection screen for prompting a user to select whether or not to execute the shutdown processing.

In a fifth aspect of the present invention, there is provided a method of controlling a network communication apparatus that includes a network port for connecting to a telephone line and a communication unit that communicates with an external apparatus via the telephone line, comprising executing shutdown processing for stopping supply of electric power to the network communication apparatus when an auto-shutdown shifting time period elapses without receiving a user's operation, detecting whether or not the network port is connected to the telephone line, selecting, based on a user's operation, whether or not to cause the shutdown processing to be executed, and notifying a user that the shutdown processing cannot be executed, in a case where to cause the shutdown processing to be executed is selected, and also it is detected that the network port is connected to the telephone line.

In a sixth aspect of the present invention, there is provided a method of controlling a network communication apparatus that includes a network port for connecting to a telephone line and a communication unit that communicates with an external apparatus via the telephone line, comprising executing shutdown processing for stopping supply of electric power to the network communication apparatus when an auto-shutdown shifting time period elapses without receiving a user's operation, detecting whether or not the network port is connected to the telephone line, selecting, based on a user's operation, whether or not to cause the shutdown processing to be executed, and notifying a user that the shutdown processing cannot be executed, when it is detected that the network port is changed from a state not connected to the telephone line to a state connected to the telephone line, in a case where to cause the shutdown processing to be executed has been selected.

In a seventh aspect of the present invention, there is provided a method of controlling a network communication apparatus that includes a network port for connecting to a telephone line and a communication unit that communicates with an external apparatus via the telephone line, comprising executing shutdown processing for stopping supply of electric power to the network communication apparatus when an auto-shutdown shifting time period elapses without receiving a user's operation, detecting whether or not the network port is connected to the telephone line, and selecting, based on a user's operation, whether or not to cause the shutdown processing to be executed, and disabling the auto-shutdown and also making the user's operation for selection impossible, when it is detected detection unit that the network port is changed from a state not connected to the telephone line to a state connected to the telephone line, in a case where to cause the shutdown processing to be executed has been selected.

In an eighth aspect of the present invention, there is provided a method of controlling a network communication apparatus that includes a network port for connecting to a telephone line and a communication unit that communicates with an external apparatus via the telephone line, comprising executing shutdown processing for stopping supply of electric power to the network communication apparatus when an auto-shutdown shifting time period elapses without receiving a user's operation, detecting whether or not the network port is connected to the telephone line, selecting, based on a user's operation, whether or not to cause the shutdown processing to be executed, and displaying, when it is detected that the network port is changed from a state not connected to the telephone line to a state connected to the telephone line, a selection screen for prompting a user to select whether or not to execute the shutdown processing.

In a ninth aspect of the present invention, there is provided a non-transitory computer-readable storage medium storing a computer-executable program for executing a method of controlling a network communication apparatus that includes a network port for connecting to a telephone line and a communication unit that communicates with an external apparatus via the telephone line, wherein the method comprises executing shutdown processing for stopping supply of electric power to the network communication apparatus when an auto-shutdown shifting time period elapses without receiving a user's operation, detecting whether or not the network port is connected to the telephone line, selecting, based on a user's operation, whether or not to cause the shutdown processing to be executed, and notifying a user that the shutdown processing cannot be executed, in a case where to cause the shutdown processing to be executed is selected, and also it is detected that the network port is connected to the telephone line.

In a tenth aspect of the present invention, there is provided a non-transitory computer-readable storage medium storing a computer-executable program for executing a method of controlling a network communication apparatus that includes a network port for connecting to a telephone line and a communication unit that communicates with an external apparatus via the telephone line, wherein the method comprises executing shutdown processing for stopping supply of electric power to the network communication apparatus when an auto-shutdown shifting time period elapses without receiving a user's operation, detecting whether or not the network port is connected to the telephone line, selecting, based on a user's operation, whether or not to cause the shutdown processing to be executed, and notifying a user that the shutdown processing cannot be executed, when it is detected that the network port is changed from a state not connected to the telephone line to a state connected to the telephone line, in a case where to cause the shutdown processing to be executed has been selected.

In an eleventh aspect of the present invention, there is provided a non-transitory computer-readable storage medium storing a computer-executable program for executing a method of controlling a network communication apparatus that includes a network port for connecting to a telephone line and a communication unit that communicates with an external apparatus via the telephone line, wherein the method comprises executing shutdown processing for stopping supply of electric power to the network communication apparatus when an auto-shutdown shifting time period elapses without receiving a user's operation, detecting whether or not the network port is connected to the telephone line, selecting, based on a user's operation, whether or not to cause the shutdown processing to be executed, and disabling the auto-shutdown and also making the user's operation for selection impossible, when it is detected detection unit that the network port is changed from a state not connected to the telephone line to a state connected to the telephone line, in a case where to cause the shutdown processing to be executed has been selected.

In a twelfth aspect of the present invention, there is provided a non-transitory computer-readable storage medium storing a computer-executable program for executing a method of controlling a network communication apparatus that includes a network port for connecting to a telephone line and a communication unit that communicates with an external apparatus via the telephone line, wherein the method comprises executing shutdown processing for stopping supply of electric power to the network communication apparatus when an auto-shutdown shifting time period elapses without receiving a user's operation, detecting whether or not the network port is connected to the telephone line, selecting, based on a user's operation, whether or not to cause the shutdown processing to be executed, and displaying, when it is detected that the network port is changed from a state not connected to the telephone line to a state connected to the telephone line, a selection screen for prompting a user to select whether or not to execute the shutdown processing.

According to the present invention, it is possible to improve the convenience of a user concerning the auto-shutdown control performed in the case where the apparatus is connected to the telephone line.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof. Here, as a network communication apparatus according to the present invention, a description will be given of a multifunction peripheral (MFP) having functions of an image processing apparatus, such as a print function and a scan function, and a FAX function.

Note that the invention according to claims is not limited to the following embodiments, and further, all features in a combination described in each of embodiments are not necessarily required for solution of the invention.

A description will be given of a first embodiment of the present invention.

Figure 1:
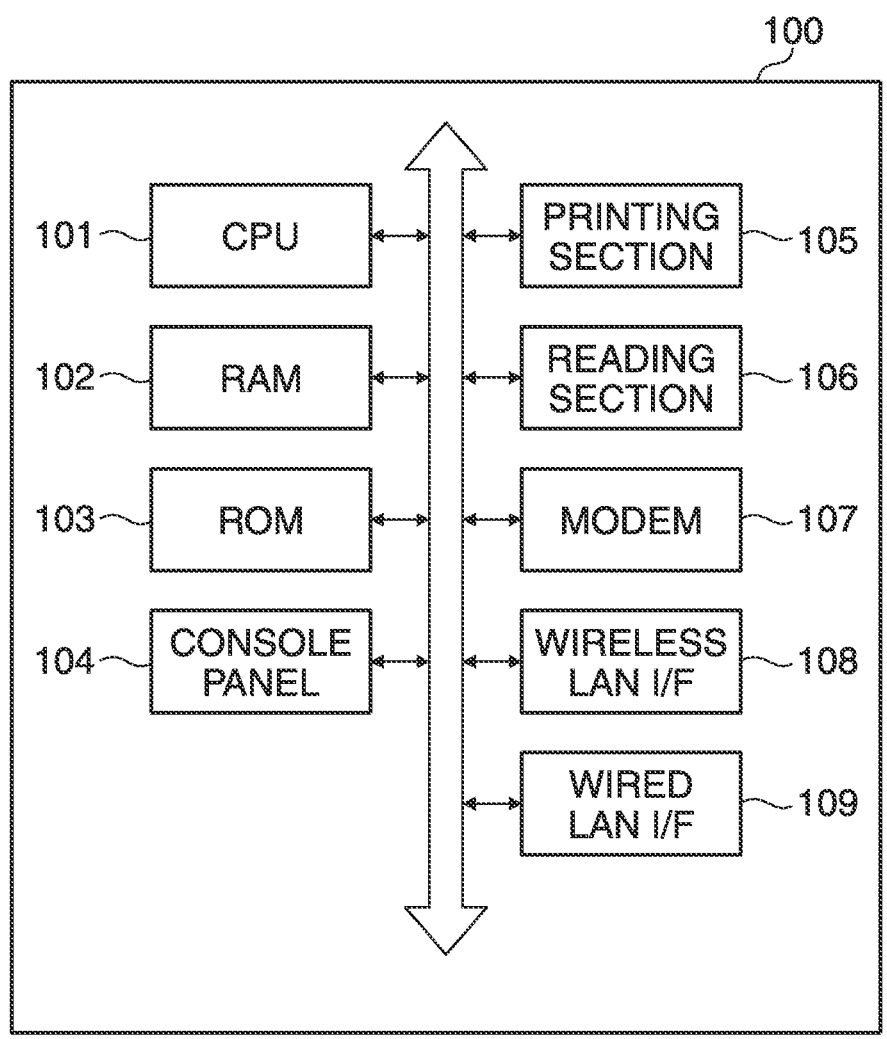
FIG. 1 is a diagram showing the hardware configuration of an MFP as a network communication apparatus according to a first embodiment of the present invention.

FIG. 1 is a diagram showing the hardware configuration of an MFP 100 as a network communication apparatus according to a first embodiment.

Referring to FIG. 1, the MFP 100 includes a CPU 101, a ROM 103, and a RAM 102. Further, the MFP 100 is electrically connected to a printing section 105 that prints an image on a sheet, a reading section 106 that reads an image on an original, a console panel 104 that displays operation conditions, and receives operations input by a user, a MODEM 107, a wireless LAN interface 108, and a wired LAN interface 109.

The ROM 103 stores firmware programs which are control programs for controlling the MFP 100, various settings, initial values, and so forth. The RAM 102 is used as a work area into which various control programs are loaded, or a storage area for temporarily storing data.

The CPU 101 controls the components of the MFP 100 according to control programs loaded from the ROM 103 and signals received from various sensors, while storing processing results in the RAM 102.

The MODEM 107 includes a network port for connecting to a telephone line, and is used to communicate with an external apparatus by demodulating a modulated signal received from the external apparatus via the telephone line, and inversely, modulating a signal to be transmitted from the apparatus to transmit the modulated signal to an external apparatus via the telephone line. The MFP 100 is capable of transmitting image data, which is generated by the reading section 106 that reads an original, from the MODEM 107 to an external apparatus by FAX transmission via the telephone line, and printing out image data received by FAX reception via the telephone line, using a printer 350. That is, the MODEM 107 is capable of transmitting and receiving image data using the telephone line. Further, in the present embodiment, a line voltage is detected by the MODEM 107 using an SDAA (silicon DAA), whereby a port state (connection state) of the MODEM 107, i.e. whether or not the telephone line is connected to the MODEM 107 is determined (line detection unit).

The wireless LAN interface 108 is an interface which enables wireless communication based on the IEEE standard 802.11 and standards pursuant to the IEEE standard 802.11.

The wired LAN interface 109 is an interface which enables wired communication based on the IEEE standard 802.3 and standards pursuant to the IEEE standard 802.3.

The MFP 100 receives data transmitted from an external apparatus via the wireless LAN interface 108 or the wired LAN interface 109. Further, the MFP 100 transmits data to an external apparatus via the wireless LAN interface 108 or the wired LAN interface 109.

The console panel 104 includes an input section, not shown, which is comprised of various buttons for receiving an input from a user, and a screen for displaying messages and settings. Examples of the various buttons include an OK button for instructing start of image processing and a cancel button for instructing cancellation of image processing.

Figure 2:
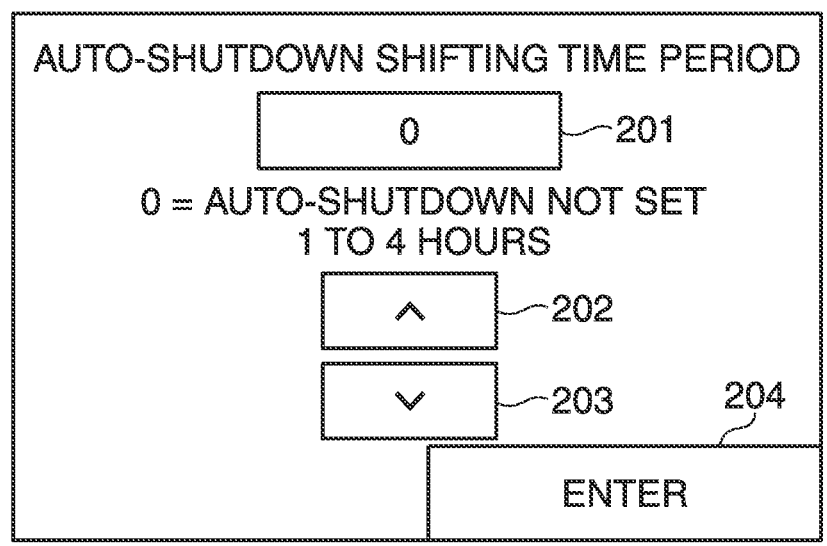
FIG. 2 is a diagram showing an operation screen displayed when auto-shutdown setting is performed on the MFP.

FIG. 2 is a diagram showing an operation screen displayed on the console panel 104 of the MFP 100 when auto-shutdown setting is performed for the MFP 100.

Referring to FIG. 2, a setting value is displayed in a setting time display section 201, and a user can change the setting value displayed in the setting time display section 201 using arrows 202 and 203 (time setting unit). Further, by pressing an enter button 204, the setting value is determined to be a value displayed in the setting time display section 201. When the setting value is determined to be 0, auto-shutdown is disabled. Further, when the setting value is determined to be one of values of 1 to 4, the auto-shutdown shifting time period is set to the determined value. For example, when the enter button 204 is pressed in a state in which a setting value of 4 is displayed in the setting time display section 201, the auto-shutdown shifting time period is set to four hours.

After that, when the set time period has elapsed without receiving any user's input to the MFP 100, auto-shutdown of the MFP 100 is executed. More specifically, when the count of an auto-shutdown timer provided in the MFP 100 (not shown in FIG. 1) for measuring a time period during which no user's operation has been performed on the MFP 100 reaches the auto-shutdown shifting time period, auto-shutdown of the MFP 100 is executed. In other words, in the MFP 100, when the auto-shutdown shifting time period has elapsed without receiving any user's input to the MFP 100, shutdown processing for stopping the supply of power to the MFP 100 is executed.

Although in FIG. 2, the user sets the auto-shutdown shifting time period, this is not limitative. For example, in a case where the auto-shutdown shifting time period (e.g. four hours) is internally set by the MFP 100, another operation screen, not shown, which enables the user to select whether to enable or disable auto-shutdown may be displayed in place of the operation screen shown in FIG. 2. In this case, if the user selects enabling of auto-shutdown on the displayed other operation screen, auto-shutdown is enabled, and the auto-shutdown shifting time period is set to four hours.

Figure 3:
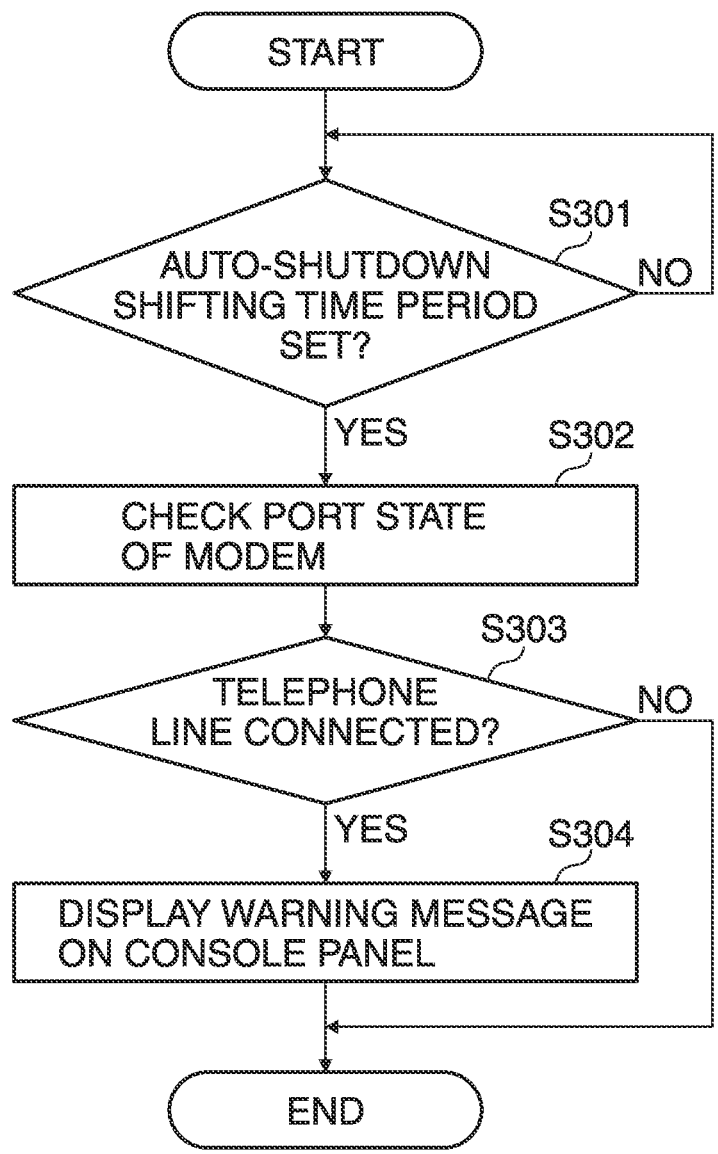
FIG. 3 is a flowchart of a screen display control process performed when auto-shutdown is set for the MFP.
Figure 4:
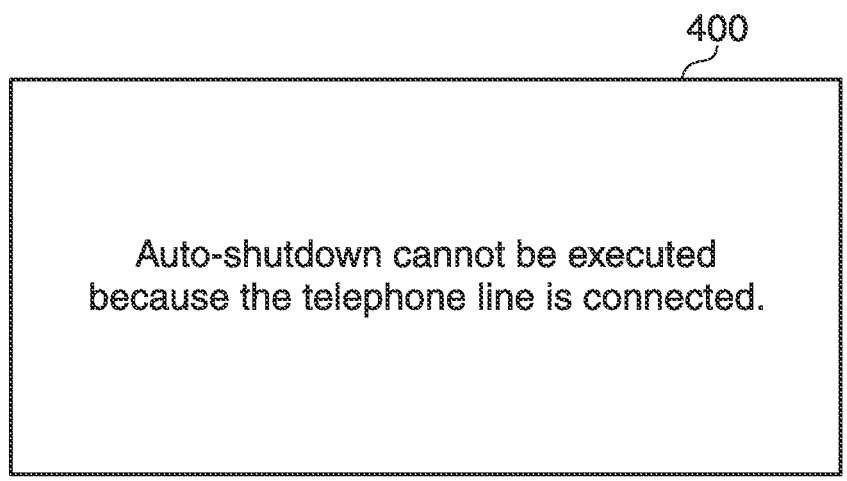
FIG. 4 is a diagram showing a warning screen to a user, which is displayed on the MFP.

FIG. 3 is a flowchart of a screen display control process performed when auto-shutdown is set for the MFP 100 as the network communication apparatus according to the first embodiment. The screen display control process is realized by the CPU 101 executing a control program stored in the ROM 103. FIG. 4 is a diagram showing a warning screen to a user, which is displayed on the MFP 100 in the first embodiment.

In a step S301, the CPU 101 confirms whether or not the user has set the auto-shutdown shifting time period on the operation screen shown in FIG. 2. If it is determined that the user has set the auto-shutdown shifting time period, the CPU 101 proceeds to a step S302. In a case where the auto-shutdown shifting time period (e.g. four hours) has been internally set in the MFP 100, in the step S301, the above-mentioned other operation screen, not shown, may be displayed in place of the operation screen shown in FIG. 2, and determination of whether or not the user has selected enabling of auto-shutdown on the displayed other operation screen may be performed.

In the step S302, the CPU 101 checks the port state of the MODEM 107.

In a step S303, the CPU 101 determines whether or not the telephone line is connected to the MODEM 107 based on a result of the check in the step S302. If it is determined that the telephone line is connected to the MODEM 107, the CPU 101 proceeds to a step S304, whereas if not, the present process is immediately terminated.

In the step S304, the CPU 101 displays the warning screen shown in FIG. 4, denoted by reference numeral 400, on the console panel 104, followed by terminating the present process.

Although the warning screen 400 shown in FIG. 4 notifies the user that auto-shutdown cannot be executed because the telephone line is connected, a warning screen only to the effect that auto-shutdown cannot be executed may be displayed without notifying the user of the reason, in the step S304.

Further, although in the present process, the message to the effect that auto-shutdown cannot be executed is notified to the user using the warning screen 400, the notification may be provided not by displaying the screen, but by sound, for example.

Figure 5:
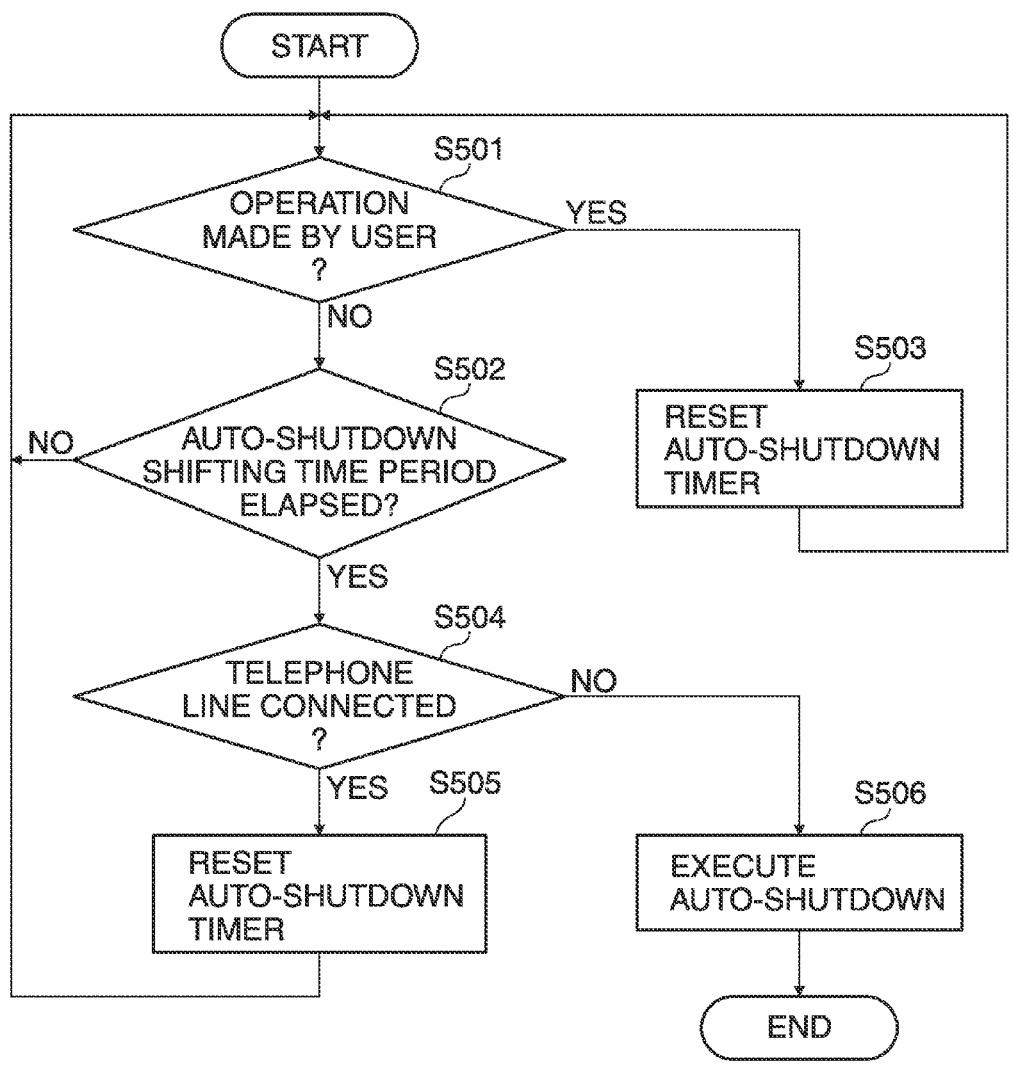
FIG. 5 is a flowchart of an auto-shutdown execution process performed by the MFP.

FIG. 5 is a flowchart of an auto-shutdown execution process performed by the MFP 100 as the network communication apparatus according to the first embodiment. This auto-shutdown execution process is also realized by the CPU 101 executing a control program stored in the ROM 103.

In a step S501, the CPU 101 determines whether or not an operation has been made on the MFP 100 by the user. If it is determined that no operation has been made, the CPU 101 proceeds to a step S502, whereas if an operation has been input, the CPU 101 proceeds to a step S503 to reset the auto-shutdown timer, and then returns to the step S501.

In the step S502, the CPU 101 determines whether or not the auto-shutdown shifting time period has elapsed. If it is determined that the auto-shutdown shifting time period has elapsed, the CPU 101 proceeds to a step S504, whereas if not, the CPU 101 returns to the step S501.

In the step S504, the CPU 101 checks a result of the determination in the step S303. If it is determined that the telephone line is connected to the MODEM 107, the CPU 101 proceeds to a step S505, whereas if not, the CPU 101 proceeds to a step S506.

In the step S505, the CPU 101 resets the auto-shutdown timer, and returns to the step S501.

In the step S506, the CPU 101 executes auto-shutdown, followed by terminating the present process.

According to the present embodiment, even though the user sets the auto-shutdown shifting time period on the operation screen shown in FIG. 2, if the telephone line is connected to the MODEM 107, a situation results in which execution of auto-shutdown is prevented even after the auto-shutdown shifting time period has elapsed without receiving any user's operation. However, even when this situation is generated, in the present embodiment, the warning screen shown in FIG. 4 is displayed on the console panel 104 so as to cause the user to be aware of the state of the MFP 100 in which auto-shutdown cannot be executed at present, and hence it is possible to improve the convenience of the user.

Next, a second embodiment of the present invention will be described. In the first embodiment, the description is given of the screen display control performed when the auto-shutdown is set for the MFP 100. In the second embodiment, screen display control is performed when the port state of the MODEM 107 is changed, more specifically, when the port state is changed from a state in which the telephone line is not connected to the MODEM 107 to a state in which the telephone line is connected to the MODEM 107. The hardware configuration and software configuration except that described hereafter of the second embodiment are the same as those of the first embodiment. Therefore, the same components are denoted by the same reference numerals and description thereof is omitted.

Figure 6:
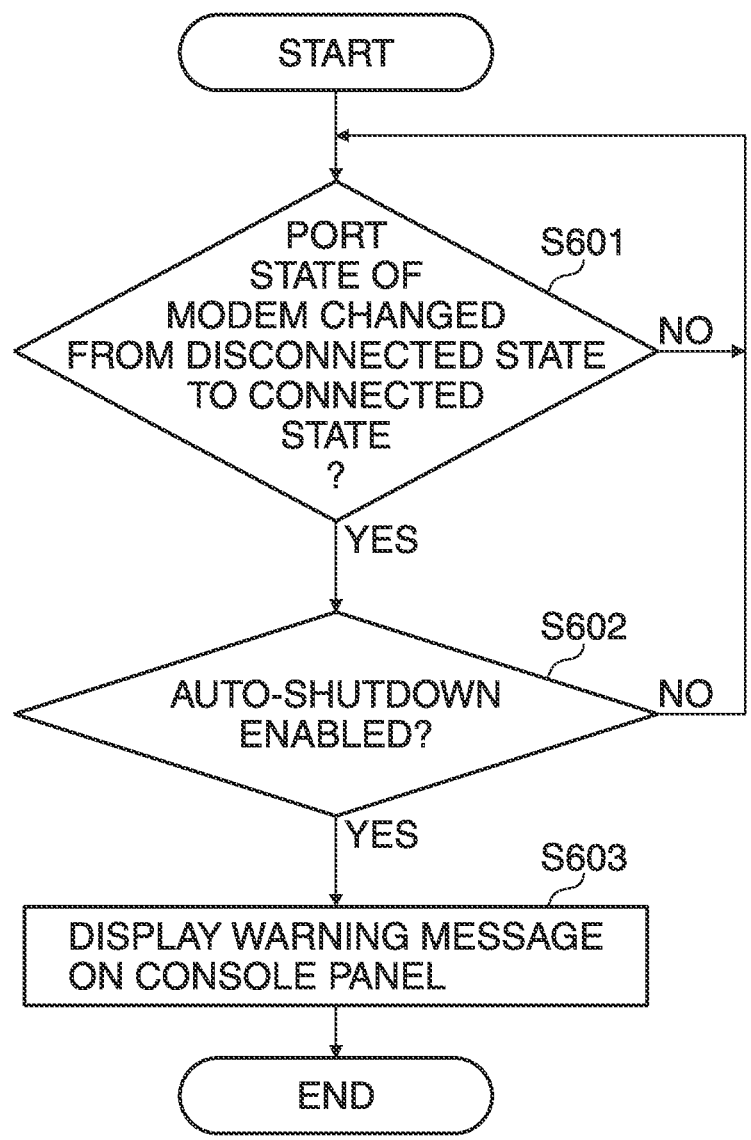
FIG. 6 is a flowchart of a screen display control process performed when a port state is changed in an MFP as a network communication apparatus according to a second embodiment of the present invention.

FIG. 6 is a flowchart of a screen display control process performed when the port state of the MODEM 107 of the MFP 100 as a network communication apparatus according to the second embodiment is changed. This screen display control process is also realized by the CPU 101 executing a control program stored in the ROM 103.

In a step S601, the CPU 101 determines whether or not the port state of the MODEM 107 has been changed from the state in which the telephone line is not connected thereto to the state in which the telephone line is connected thereto. If it is determined that the port state has been changed, the CPU 101 proceeds to a step S602.

In the step S602, the CPU 101 determines whether or not auto-shutdown has been enabled. More specifically, if the setting value has been set to 0 by a user's operation on the operation screen shown in FIG. 2, it is determined that auto-shutdown has been disabled, whereas if the setting value has been set to a value other than 0, it is determined that auto-shutdown has been enabled. If it is determined that auto-shutdown has been enabled, the CPU 101 proceeds to a step S603, whereas if it is determined that auto-shutdown has been disabled, the CPU 101 returns to the step S601. Note that, in a case where the auto-shutdown shifting time period (e.g. four hours) has been internally set in the MFP 100, in the step S602, the above-mentioned other operation screen, not shown, may be displayed in place of the operation screen shown in FIG. 2 to thereby determine whether the user has selected enabling of auto-shutdown or disabling of the same on the displayed other operation screen.

In the step S603, the CPU 101 displays the warning screen shown in FIG. 4 on the console panel 104, followed by terminating the present process.

According to the present embodiment, even though the user sets the auto-shutdown shifting time period on the operation screen shown in FIG. 2 in the state in which the telephone line is not connected to the MODEM 107, if the telephone line is connected to the MODEM 107 thereafter, auto-shutdown is not executed even after the auto-shutdown shifting time period has elapsed without receiving any user's operation. However, even when this situation is generated, in the present embodiment, the warning screen shown in FIG. 4 is displayed on the console panel 104 so as to cause the user to be aware of the state of the MFP 100 in which auto-shutdown cannot be executed at present, and hence it is possible to improve the convenience of the user.

Next, a third embodiment of the present invention will be described. In the second embodiment, the description is given of the control for displaying the warning on the console panel 104 of the MFP 100 without changing the auto-shutdown setting itself when the port state of the MODEM 107 is changed. In contrast, in the third embodiment, control for changing the auto-shutdown setting itself is also performed when the port state of the MODEM 107 is changed. The hardware configuration and software configuration except that described hereafter of the third embodiment are the same as those of the first embodiment. Therefore, the same components are denoted by the same reference numerals and description thereof is omitted.

Figure 7:
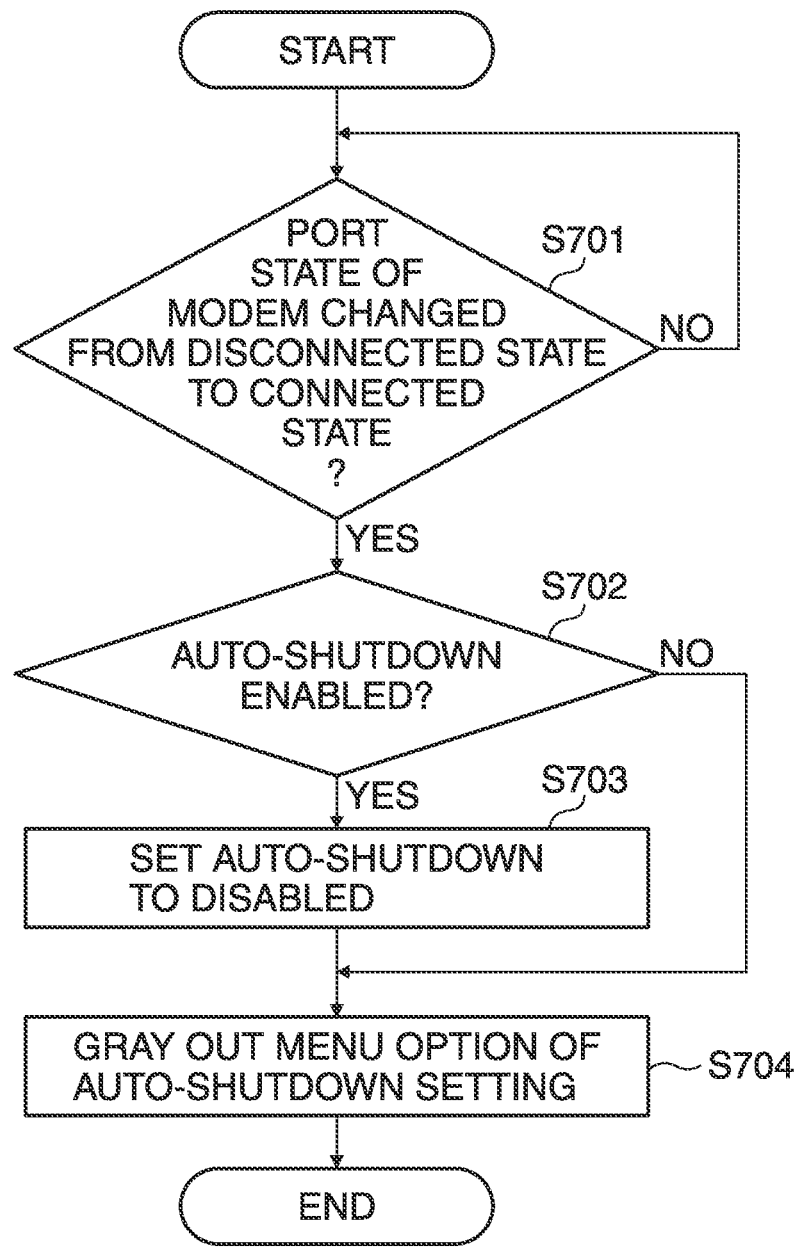
FIG. 7 is a flowchart of an auto-shutdown setting change control process performed when a port state is changed in an MFP as a network communication apparatus according to a third embodiment of the present invention.

FIG. 7 is a flowchart of an auto-shutdown setting change control process performed when the port state of the MFP 100 as a network communication apparatus according to the third embodiment is changed. This auto-shutdown setting change control process is also realized by the CPU 101 executing a control program stored in the ROM 103.

In a step S701, the CPU 101 determines whether or not the port state of the MODEM 107 has been changed from the state in which the telephone line is not connected thereto to the state in which the telephone line is connected thereto. If it is determined that the port state has been changed, the CPU 101 proceeds to a step S702.

In the step S702, the CPU 101 determines whether or not auto-shutdown has been enabled. This determination process is performed by performing the same process in the step S602 in FIG. 6. If it is determined that auto-shutdown has been enabled, the CPU 101 proceeds to a step S703, whereas if it is determined that auto-shutdown has been disabled, the CPU 101 proceeds to a step S704.

In the step S703, the CPU 101 changes the auto-shutdown setting such that it is disabled, and proceeds to the step S704.

Figure 8:
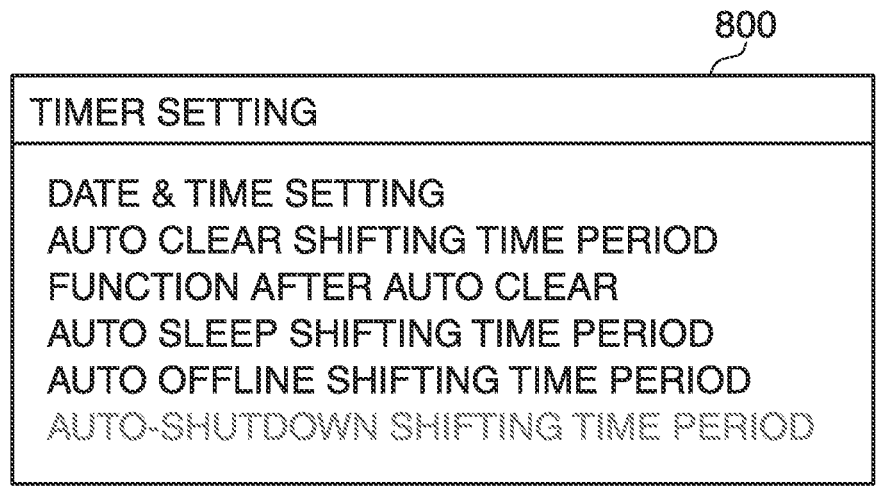
FIG. 8 is a diagram showing a timer setting screen on which the setting is changed in a step in FIG. 7.

In the step S704, the CPU 101 changes the setting of a timer setting screen 800 (see FIG. 8) on the console panel 104 such that a menu option of auto-shutdown setting (disables auto-shutdown setting) is grayed out to thereby make it impossible for the user to perform auto-shutdown setting on the operation screen, shown in FIG. 2, displayed on the console panel 104, followed by terminating the present process.

Note that after disabling the auto-shutdown setting menu option in the step S704, the warning screen shown in FIG. 4 may be displayed on the console panel 104.

According to the present embodiment, even though the user sets the auto-shutdown shifting time period on the operation screen shown in FIG. 2 in the state in which the telephone line is not connected to the MODEM 107, if the telephone line is connected to the MODEM 107 after that, auto-shutdown is not executed even after the auto-shutdown shifting time period has elapsed without receiving any user's operation. However, even when this situation is generated, in the present embodiment, the timer setting screen 800 is displayed in which the auto-shutdown setting menu option is grayed out to disable auto-shutdown setting so as to cause the user to be aware of the state of the MFP 100 in which auto-shutdown cannot be executed at present, and hence it is possible to improve the convenience of the user.

Next, a fourth embodiment of the present invention will be described. In the third embodiment, the description is given of the auto-shutdown setting change control for disabling auto-shutdown in a case where the port state of the MODEM 107 of the MFP 100 is changed from the state in which the telephone line is not connected thereto to the state in which the telephone line is connected thereto. In the fourth embodiment, in such a case, there is performed control for prompting the user to select whether to execute auto-shutdown or not. The hardware configuration of the third embodiment is the same as that of the first embodiment. Therefore, the same components are denoted by the same reference numerals and description thereof is omitted.

Figure 9:
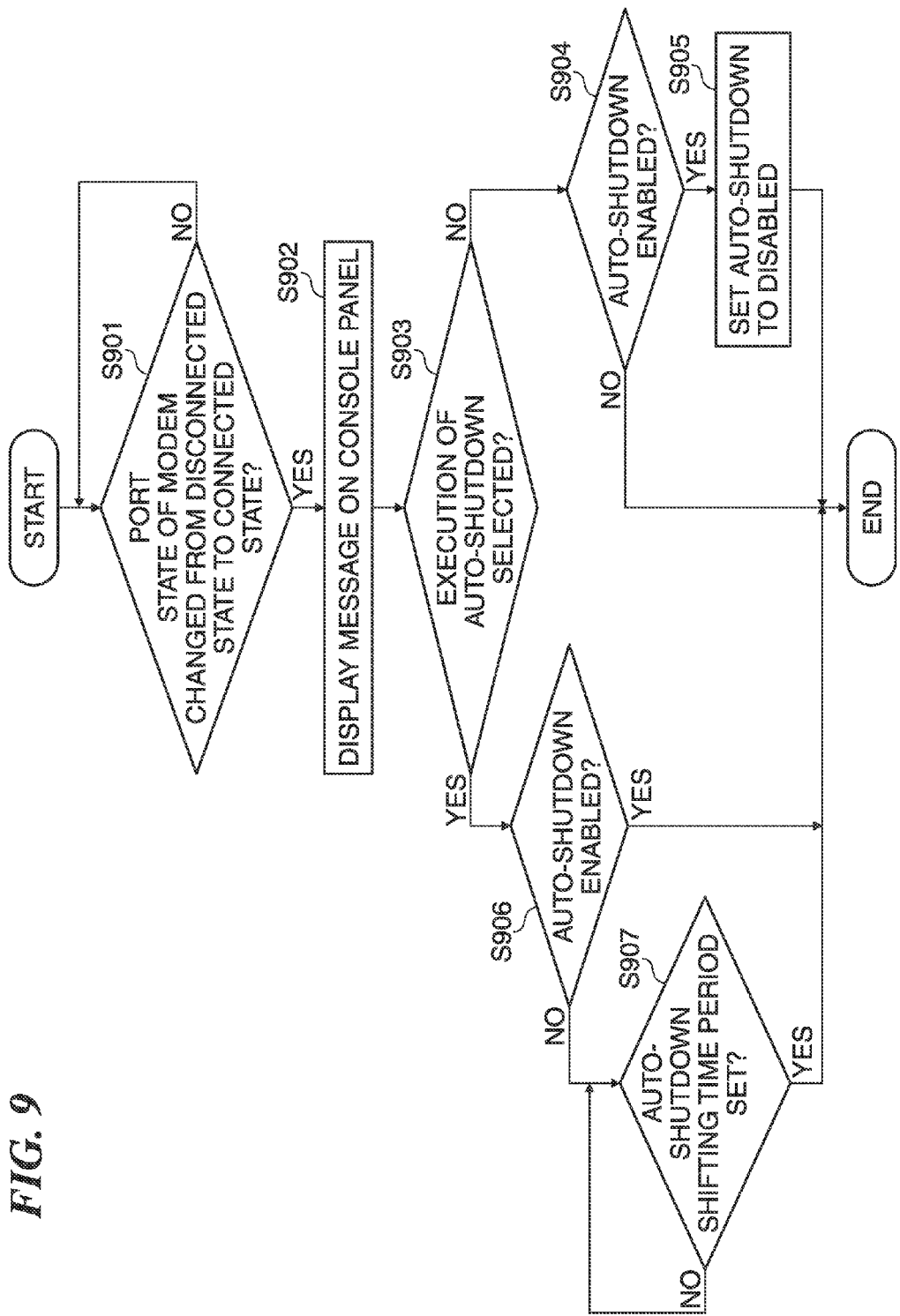
FIG. 9 is a flowchart of an auto-shutdown execution selection control process performed when a port state is changed in an MFP as a network communication apparatus according to a fourth embodiment of the present invention.

FIG. 9 is a flowchart of an auto-shutdown execution selection control process performed when the port state of the MFP 100 as a network communication apparatus according to the fourth embodiment is changed. This auto-shutdown execution selection control process is also realized by the CPU 101 executing a control program stored in the ROM 103.

In a step S901, the CPU 101 determines whether or not the port state of the MODEM 107 has been changed from the state in which the telephone line is not connected thereto to the state in which the telephone line is connected thereto. If it is determined that the port state has been changed, the CPU 101 proceeds to a step S902.

Figure 10:
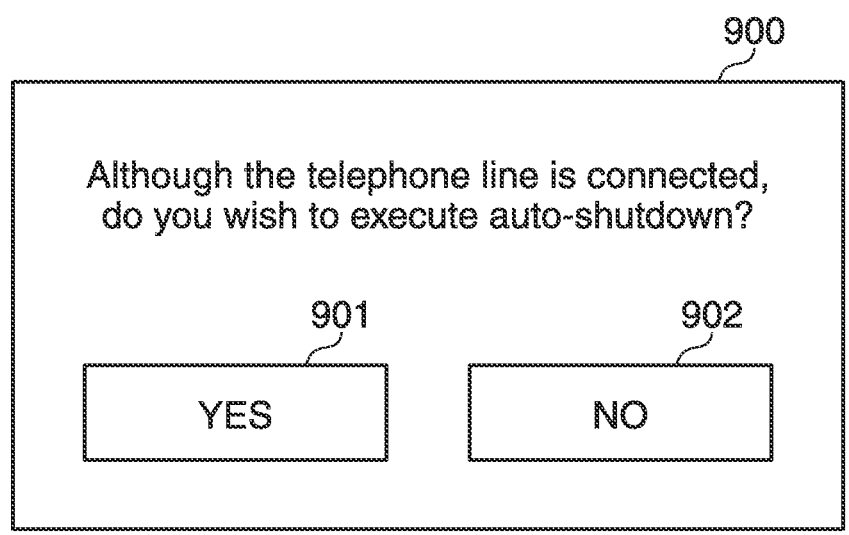
FIG. 10 is a diagram showing a selection screen for prompting a user to select whether or not to execute auto-shutdown, which is displayed on the MFP as the network communication apparatus according to the fourth embodiment.

In the step S902, the CPU 101 displays a selection screen 900 shown in FIG. 10 for prompting the user to select whether or not to execute auto-shutdown, on the console panel 104.

In a step S903, if the user has selected an "YES" button 901, appearing in FIG. 10, the CPU 101 proceeds to a step S906, whereas if the user has selected a "NO" button 902, appearing in FIG. 10, the CPU 101 proceeds to a step S904.

In the step S904, the CPU 101 determines whether or not auto-shutdown has been enabled. This determination process is performed by performing the same process in the step S602 in FIG. 6. If it is determined that auto-shutdown has been enabled, the CPU 101 proceeds to a step S905, whereas if it is determined that auto-shutdown has been disabled, the present process is terminated.

In the step S905, the CPU 101 changes the auto-shutdown setting such that auto-shutdown is disabled, followed by terminating the present process.

On the other hand, similar to the step S904, in the step S906 as well, the CPU 101 determines whether or not auto-shutdown has been enabled. This determination process is performed by performing the same process in the step S602 in FIG. 6. If it is determined that auto-shutdown has been enabled, the present process is terminated, whereas if it is determined that auto-shutdown has been disabled, the CPU 101 proceeds to a step S907.

In the step S907, the CPU 101 displays the operation screen shown in FIG. 2, and determines whether or not an auto-shutdown shifting time period (other than 0 hours) is set based on a user's operation. If it is determined that the auto-shutdown shifting time period (other than 0 hours) is set, the present process is terminated.

Figure 11:
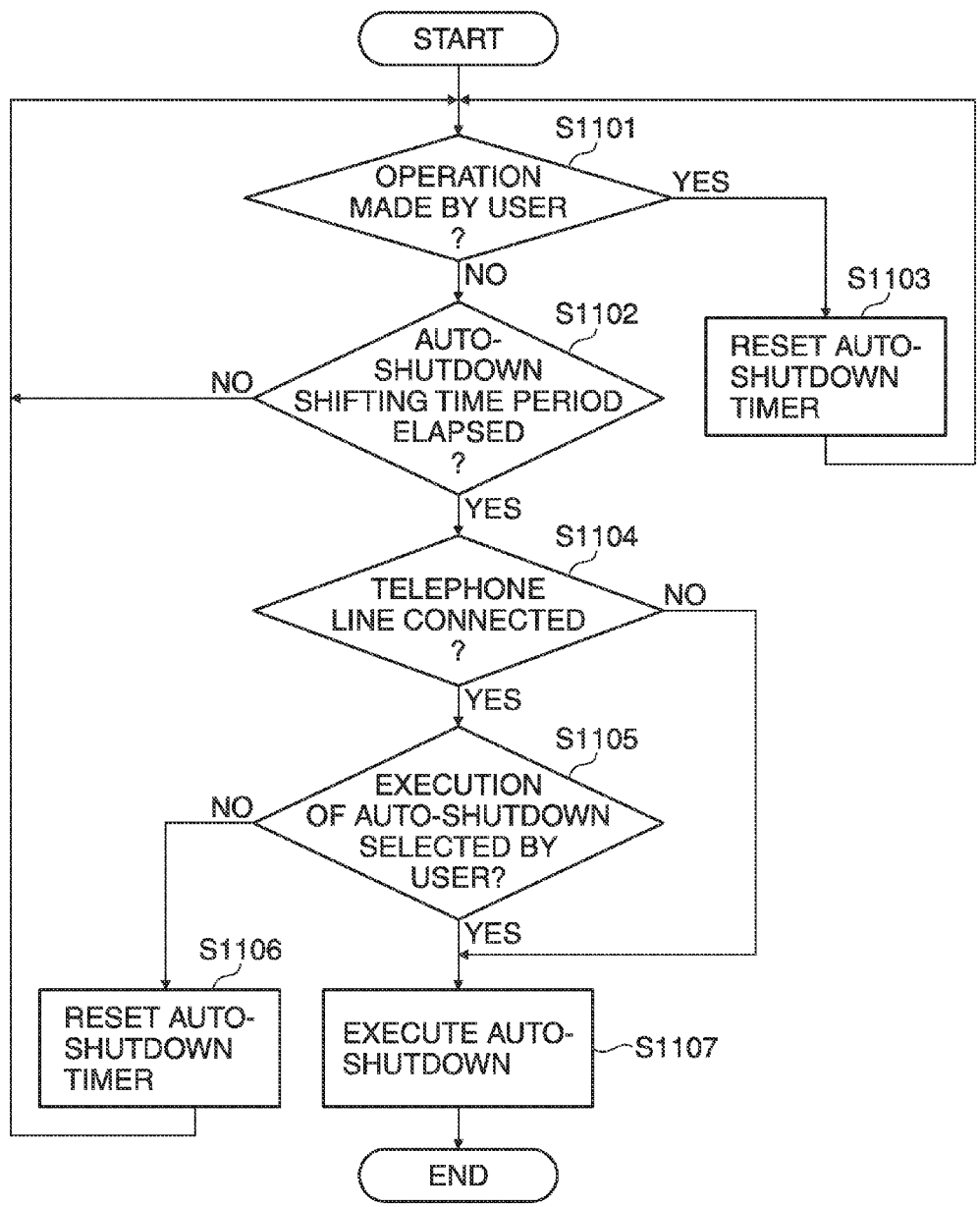
FIG. 11 is a flowchart of an auto-shutdown execution process performed by the MFP as the network communication apparatus according to the fourth embodiment.

FIG. 11 is a flowchart of an auto-shutdown execution process performed by the MFP 100 as the network communication apparatus according to the fourth embodiment. Note that a step S1101 to a step S1104 in FIG. 11 are the same as the step S501 to the step S504 in FIG. 5, and hence description of these steps is omitted. This auto-shutdown execution process is also realized by the CPU 101 executing a control program stored in the ROM 103.

If it is determined in the step S1104 that the telephone line is connected to the MODEM 107, the CPU 101 proceeds to a step S1105, whereas if not, the CPU 101 proceeds to a step S1107.

In the step S1105, the CPU 101 checks a result of selection performed by the user in the step S903 in FIG. 9. If the "YES" button 901 appearing in FIG. 10 has been selected by the user, the CPU 101 proceeds to the step S1107, whereas if the "NO" button 902 appearing in FIG. 10 has been selected by the user, the CPU 101 proceeds to a step S1106.

In the step S1106, the CPU 101 resets the auto-shutdown timer, and returns to the step S1101.

In the step S1107, the CPU 101 executes auto-shutdown, followed by terminating the present process.

According to the present embodiment, when the port state of the MODEM 107 has been changed from the state in which the telephone line is not connected thereto to the state in which the telephone line is connected thereto, the selection screen 900, shown in FIG. 10, for prompting the user to select whether or not to execute auto-shutdown is displayed on the console panel 104. By displaying this selection screen, when the auto-shutdown shifting time period has elapsed without receiving any user's operation, even if the telephone line is still connected to the MODEM 107, whether or not to execute auto-shutdown is determined according to a result of user's selection on this selection screen 900, and hence it is possible to improve the convenience of the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, although the auto-shutdown function in the embodiments is the function for automatically turning off the power supply in a case where no user's operation has been performed on the MFP 100 during the auto-shutdown shifting time period set by the user on the operation screen shown in FIG. 2, the auto-shutdown function may be a function for automatically turning off the power supply when it comes to a time set by the user.

Although in the present embodiments, the line voltage is detected by the MODEM using the SDAA to thereby determine whether or not the telephone line is connected to the MODEM, any other method may be employed insofar as the method makes it possible to determine whether or not the telephone line is connected.

Further, although in the embodiments, whether or not to execute auto-shutdown is determined when the auto-shutdown shifting time period measured by the auto-shutdown timer expires, the auto-shutdown timer may be stopped when whether or not to execute auto-shutdown is determined to thereby disable auto-shutdown. For example, there may be used such a method as will stop counting of the auto-shutdown timer when the telephone line is connected and start counting when the telephone line is disconnected.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2015-136874 filed Jul. 8, 2015, which is hereby incorporated by reference herein in its entirety.

What is claimed is:

1. A network communication apparatus, comprising:
a network port connectable to a telephone line;
a communicator that communicates with an external apparatus via the telephone line; and
processing circuitry that causes the network communication apparatus to:
execute shutdown processing for stopping supply of electric power to the network communication apparatus when an auto-shutdown shifting time period elapses without receiving a user's operation;
detect whether or not the network port is connected to the telephone line;
determine whether or not the shutdown processing is enabled; and
display, when it is detected that the network port is changed from a state of not being connected to the telephone line to a state of being connected to the telephone line, a selection screen for prompting a user to select whether or not to execute the shutdown processing.

2. The network communication apparatus according to claim 1, wherein when not to execute the shutdown processing is selected on the selection screen, in a case where the shutdown processing is enabled, execution of the shutdown processing is disabled.

3. The network communication apparatus according to claim 1, wherein when the auto-shutdown shifting time period has elapsed without receiving a user's operation, in a case where it is detected that the network port is connected to the telephone line, the shutdown processing is executed when to execute the shutdown processing has been selected on the selection screen.

4. The network communication apparatus according to claim 1, wherein the network communication apparatus is an image processing apparatus.

5. The network communication apparatus according to claim 4, wherein the communicator transmits and receives image data using the telephone line via the network port.

6. The network communication apparatus according to claim 5, wherein the processing circuitry further causes the network communication apparatus to output the received image data and to generate the image data to be transmitted.

7. A method of controlling a network communication apparatus that includes a network port connectable to a telephone line and a communicator that communicates with an external apparatus via the telephone line, comprising:
executing shutdown processing for stopping supply of electric power to the network communication apparatus when an auto-shutdown shifting time period elapses without receiving a user's operation;
detecting whether or not the network port is connected to the telephone line; and
determining, based on a user's operation, whether or not the shutdown processing is enabled; and
disabling the shutdown processing and making the user's operation, upon which the determination of whether or not the shutdown processing is enabled is based, impossible, when it is detected that the network port is changed from a state of not being connected to the telephone line to a state of being connected to the telephone line, in a case where execution of the shutdown processing is enabled.

8. A method of controlling a network communication apparatus that includes a network port connectable to a telephone line and a communicator that communicates with an external apparatus via the telephone line, comprising:
executing shutdown processing for stopping supply of electric power to the network communication apparatus when an auto-shutdown shifting time period elapses without receiving a user's operation;
detecting whether or not the network port is connected to the telephone line;
determining whether or not the shutdown processing is enabled; and
displaying, when it is detected that the network port is changed from a state of not being connected to the telephone line to a state of being connected to the telephone line, a selection screen for prompting a user to select whether or not to execute the shutdown processing.

9. A non-transitory computer-readable storage medium storing a computer-executable program for executing a method of controlling a network communication apparatus that includes a network port connectable to a telephone line and a communicator that communicates with an external apparatus via the telephone line,
wherein the method comprises:
executing shutdown processing for stopping supply of electric power to the network communication apparatus when an auto-shutdown shifting time period elapses without receiving a user's operation;
detecting whether or not the network port is connected to the telephone line; and
determining, based on a user's operation, whether or not the shutdown processing is enabled; and
disabling the shutdown processing and making the user's operation, upon which the determination of whether or not the shutdown processing is enabled is based, impossible, when it is detected that the network port is changed from a state of not being connected to the telephone line to a state of being connected to the telephone line, in a case where execution of the shutdown processing is enabled.

10. A non-transitory computer-readable storage medium storing a computer-executable program for executing a method of controlling a network communication apparatus that includes a network port connectable to a telephone line and a communicator that communicates with an external apparatus via the telephone line,
wherein the method comprises:
executing shutdown processing for stopping supply of electric power to the network communication apparatus when an auto-shutdown shifting time period elapses without receiving a user's operation;
detecting whether or not the network port is connected to the telephone line;
determining whether or not the shutdown processing is enabled; and
displaying, when it is detected that the network port is changed from a state of not being connected to the telephone line to a state of being connected to the telephone line, a selection screen for prompting a user to select whether or not to execute the shutdown processing.

* * * * *